United States Patent
Sawyer et al.

(10) Patent No.: US 11,190,481 B2
(45) Date of Patent: *Nov. 30, 2021

(54) DETERMINISTIC TRAFFIC MANAGEMENT IN AN ANYCAST NETWORK

(71) Applicant: Verizon Digital Media Services Inc., Dulles, VA (US)

(72) Inventors: Derrick Sawyer, Santa Clarita, CA (US); Kyle Okamoto, Setauket, NY (US); Robert Perry, Los Angeles, CA (US)

(73) Assignee: Verizon Digital Media Services Inc., Dulles, VA (US)

( * ) Notice: Subject to any disclaimer, the term of this patent is extended or adjusted under 35 U.S.C. 154(b) by 66 days.

This patent is subject to a terminal disclaimer.

(21) Appl. No.: 16/788,958

(22) Filed: Feb. 12, 2020

(65) Prior Publication Data
US 2020/0220839 A1   Jul. 9, 2020

Related U.S. Application Data

(63) Continuation of application No. 15/800,380, filed on Nov. 1, 2017, now Pat. No. 10,567,333.

(51) Int. Cl.
*H04W 72/04* (2009.01)
*H04L 29/12* (2006.01)
(Continued)

(52) U.S. Cl.
CPC ...... *H04L 61/1511* (2013.01); *H04L 12/5691* (2013.01); *H04L 45/74* (2013.01); *H04L 47/122* (2013.01); *H04L 47/125* (2013.01)

(58) Field of Classification Search
CPC ............ H04L 61/1511; H04L 12/5691; H04L 47/122; H04L 45/74
See application file for complete search history.

(56) References Cited

U.S. PATENT DOCUMENTS 6,785,704 B1   8/2004   McCanne
7,313,631 B1   12/2007   Sesmun et al.
(Continued)

OTHER PUBLICATIONS

European Search Report for EP18192604, dated Mar. 26, 2019, 13 pages.

*Primary Examiner* — Hassan Kizou
*Assistant Examiner* — Mahbubul Bar Chowdhury
(74) *Attorney, Agent, or Firm* — Ansari Katiraei LLP; Arman Katiraei; Sadiq Ansari

(57) ABSTRACT

A two-tier Anycast addressing hierarchy enables deterministic traffic management in an Anycast system. Different locations of the Anycast system advertise a common Anycast cover route comprising a first-tier Anycast address with a first address prefix, and different specific routes comprising a set of second-tier Anycast addresses with a second address prefix, wherein each address of the set of second-tier Anycast addresses falls within the already advertised Anycast cover route, and wherein the second prefix is larger than the first prefix. Domain Name System (DNS) operation can resolve queries to the cover route when normal Anycast operation is desired or can be modified to resolve a subset of queries to a particular second-tier address in order to shift a deterministic amount of traffic based on the resolved subset of queries to a deterministically selected Anycast system location based on the location from which the particular second-tier address is advertised.

17 Claims, 11 Drawing Sheets

(51) Int. Cl.
*H04L 12/803* (2013.01)
*H04L 12/741* (2013.01)
*H04L 12/54* (2013.01)

(56) References Cited

U.S. PATENT DOCUMENTS

| | | |
|---|---|---|
| 7,979,580 B2 | 7/2011 | Swildens et al. |
| 8,606,938 B1 | 12/2013 | Chong et al. |
| 8,745,177 B1 | 6/2014 | Kazerani et al. |
| 9,774,619 B1* | 9/2017 | Radlein ............... H04L 63/1458 |
| 9,923,959 B2 | 3/2018 | Flavel et al. |
| 2008/0235400 A1 | 9/2008 | Slocombe et al. |
| 2009/0113057 A1 | 4/2009 | Van Der Merwe et al. |
| 2009/0327489 A1* | 12/2009 | Swildens ............ H04L 61/1511 |
| | | 709/224 |
| 2015/0040173 A1* | 2/2015 | Panagos .................. H04L 45/74 |
| | | 725/116 |
| 2015/0215388 A1* | 7/2015 | Kontothanassis ... H04L 67/1008 |
| | | 709/226 |
| 2017/0134274 A1* | 5/2017 | Araújo ..................... H04L 45/74 |
| 2017/0257294 A1* | 9/2017 | Santoro ............... H04L 67/1008 |

\* cited by examiner

DETERMINISTIC TRAFFIC MANAGEMENT IN AN ANYCAST NETWORK

CLAIM OF BENEFIT TO RELATED APPLICATIONS

This application is a continuation of U.S. nonprovisional application Ser. No. 15/800,380 entitled "Deterministic Traffic Management in an Anycast Network", filed Nov. 1, 2017, now U.S. Pat. No. 10,567,333. The contents of application Ser. No. 15/800,380 are hereby incorporated by reference.

BACKGROUND ART

Anycast is a network addressing and routing methodology whereby the same network addressing is advertised from two or more different network locations. FIG. 1 conceptually illustrates an Anycast based network architecture. There are two different network locations, also referred to as points-of-presence (PoPs) 110 and 120, from which one or more servers operate to deliver the same content or services to different requesting clients. Each PoP 110 and 120 advertises that it is accessible at the same Internet Protocol (IP) address. In particular, the gateway router at each PoP 110 and 120 distributes Border Gateway Protocol (BGP) advertisement messages (i.e., BGP update messages) to neighboring network routers. The advertisements convey the number of hops to an address through a sequence of Autonomous System (AS) identifiers or other identifiers. The advertisement messages identify the same IP addressing for reaching each PoP 110 and 120.

The other network routers receive the advertisements and build routing or forwarding tables that identify the shortest path to each advertised address. Thus, when a request directed to the Anycast address advertised from PoPs 110 and 120 is received by router 130, router 130 identifies PoP 110 as the closest destination and routes the request to PoP 110. When a request directed to the Anycast address advertised from PoPs 110 and 120 is received by router 140, router 140 identifies PoP 120 as the closest destination and routes the request to PoP 120 instead of PoP 110.

Anycast provides various advantages over traditional Unicast addressing and routing. For Unicast, each destination is assigned a unique address. Domain Name System (DNS) query resolution is complicated by the fact that if two different locations or PoPs host content for the queried domain, the DNS server performs some logic to identify the optimal location before resolving the query. No such logic is required for Anycast because each query to a particular domain that is accessible at a particular Anycast address is simply resolved to that particular Anycast address regardless of where the query is received, where the query originated from, or where a subsequent request is to be routed to. For Unicast, the logic typically involves the DNS server looking up its own location or the location of the requestor in order to identify the Unicast address of the closest PoP or server for the queried domain. This is one example in which Anycast can provide improved performance relative to Unicast.

An Anycast based network architecture is also significantly easier to setup and manage than a Unicast based network architecture. There are fewer addresses to manage and link to geographic regions or other criteria, thereby reducing the likelihood for improper or suboptimal routing of requests. There is also significantly less configuration overhead. In a Unicast based network architecture, every time DNS operation is changed to route a domain from a first Unicast address to a second or other Unicast address, that change is tracked so that the DNS operation can be restored or reset if needed.

Anycast involves relinquishing control of the routing to the network. As a result, Anycast does not allow for deterministic shifting of a specific subset or a specific amount of traffic from one Anycast location to other specifically selected Anycast locations. Such deterministic shifting of traffic is easily achieved in a Unicast based network architecture by simply changing the DNS resolution for the traffic that is to be shifted from the first address of a source location to the different second address of a desired destination location. However, since all locations in an Anycast based network architecture advertise the same addressing, such deterministic traffic shifting via DNS resolution is not possible. Pulling the address advertisements from the source location is one manner to shift traffic in the Anycast based network architecture, but the amount of traffic or load to be shifted from the source location and which destination locations that traffic is shifted to is not deterministically controllable by simply pulling the address advertisements.

Deterministic management of traffic is effective in combatting network attacks, maintaining uptime in the event of an outage or failure in a particular location, balancing capacity in response to high demand or usage at a particular location, and improving performance. There is therefore a need to provide deterministic traffic controls in an Anycast based network architecture. In particular, there is a need to retain the simplicity and performance advantages of Anycast while also having the ability to shift specific amounts of traffic to specifically selected destinations within the Anycast based network architecture.

BRIEF DESCRIPTION OF THE DRAWINGS

A preferred embodiment for deterministic traffic management in an Anycast network will now be described, by way of example only, with reference to the accompanying drawings in which.

DETAILED DESCRIPTION

Disclosed are systems and methods for deterministic traffic management in an Anycast based network architecture. In particular, the embodiments provide an Anycast based system and Anycast methodology for shifting specific amounts of traffic or load from a first location of the Anycast system to one or more specifically selected second locations of the Anycast system without deviating from the Anycast addressing and routing, and without having to assign different Unicast addressing to the different locations. In other words, the deterministic traffic management is achieved while continuing to advertise the same Anycast addressing from the different locations of the Anycast system.

In some embodiments, the deterministic traffic management in an Anycast based network architecture involves creating an Anycast system with a two-tier Anycast addressing hierarchy. The two-tier addressing hierarchy is created by advertising a common Anycast cover route (i.e., a first Anycast address) from the different Anycast system locations as per traditional Anycast operation, while also advertising more specific routes (i.e., a set of second Anycast addresses) within the already advertised Anycast cover route from the different Anycast system locations.

The first-tier Anycast cover route advertised from the various Anycast system locations has the same address or address subnet, whereas the second-tier specific routes are different Anycast addresses falling within the subnet of the Anycast cover route. For example, the cover route advertised from the multiple Anycast system locations can be a /24 Internet Protocol (IP) address (e.g., 1.1.1.0/24) and the specific routes are different /28 IP addresses (e.g., 1.1.1.100/28 and 1.1.1.101/28) that the different Anycast system locations advertise. Different subnet masks can be used for addressing advertised in the cover routes and the specific routes so long as the specific route subnet mask or address prefix is larger than the subnet mask or address prefix of the corresponding cover route. Thus, instead of /24 and /28 subnet masks for the different Anycast addressing tiers, /23 and /29 subnet masks or /18 and /30 subnet masks can be used. More generally, the cover route addressing can be specified with a /12-/31 address prefix and the specific route addressing can be specified with a /13-/32 address prefix so long as the specific route address prefix remains larger than the address prefix of the cover route. The same applies for an Anycast system with IP version 6 (IPv6) addressing. In some such embodiments, the cover routes can advertise a /48 IPv6 address and the specific routes can advertise a /64 IPv6 address within the /48 IPv6 address, such as fc00::/48 and fc00:0:1::/64.

Figure 1:
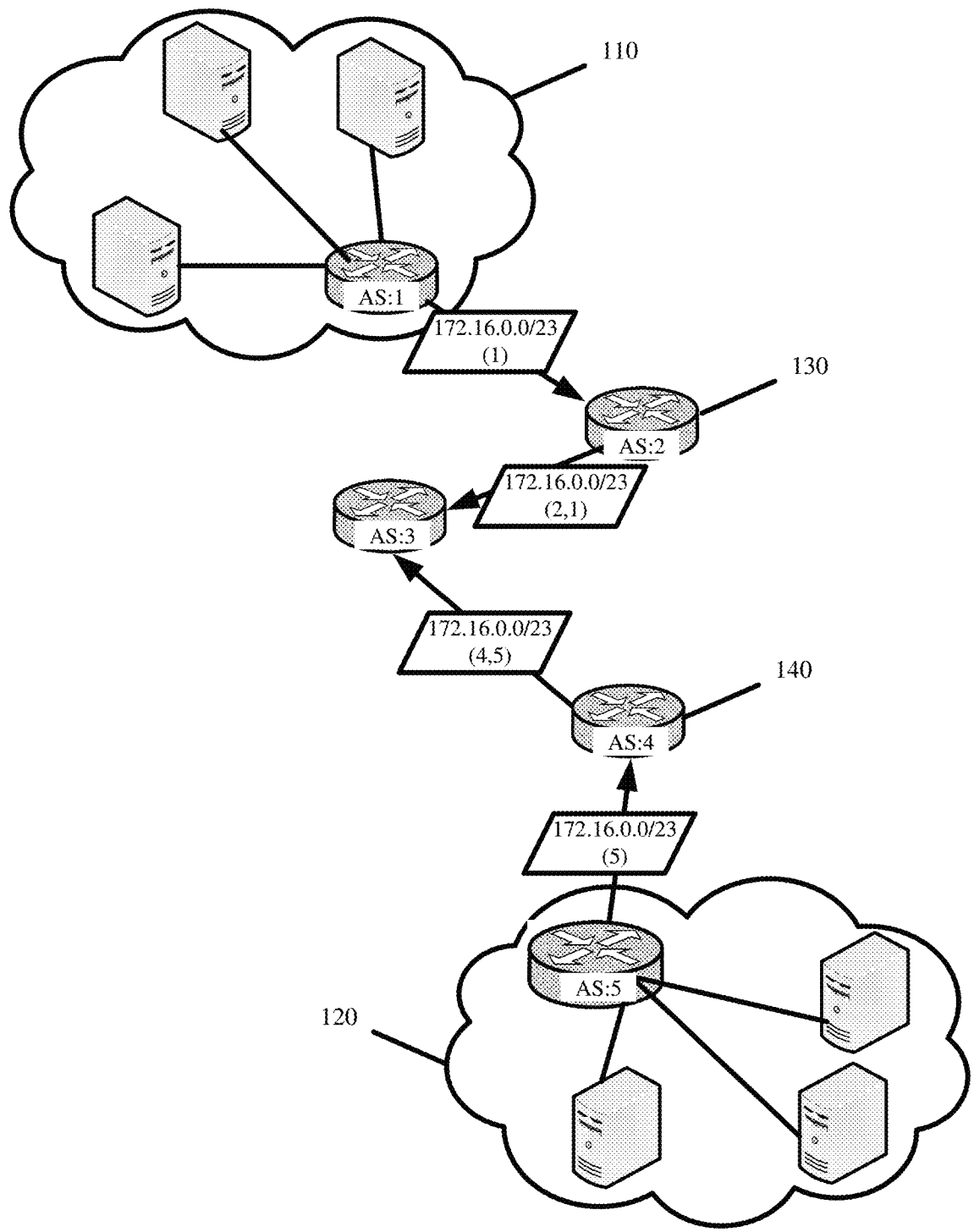
FIG. 1 conceptually illustrates an Anycast based network architecture.
Figure 2:
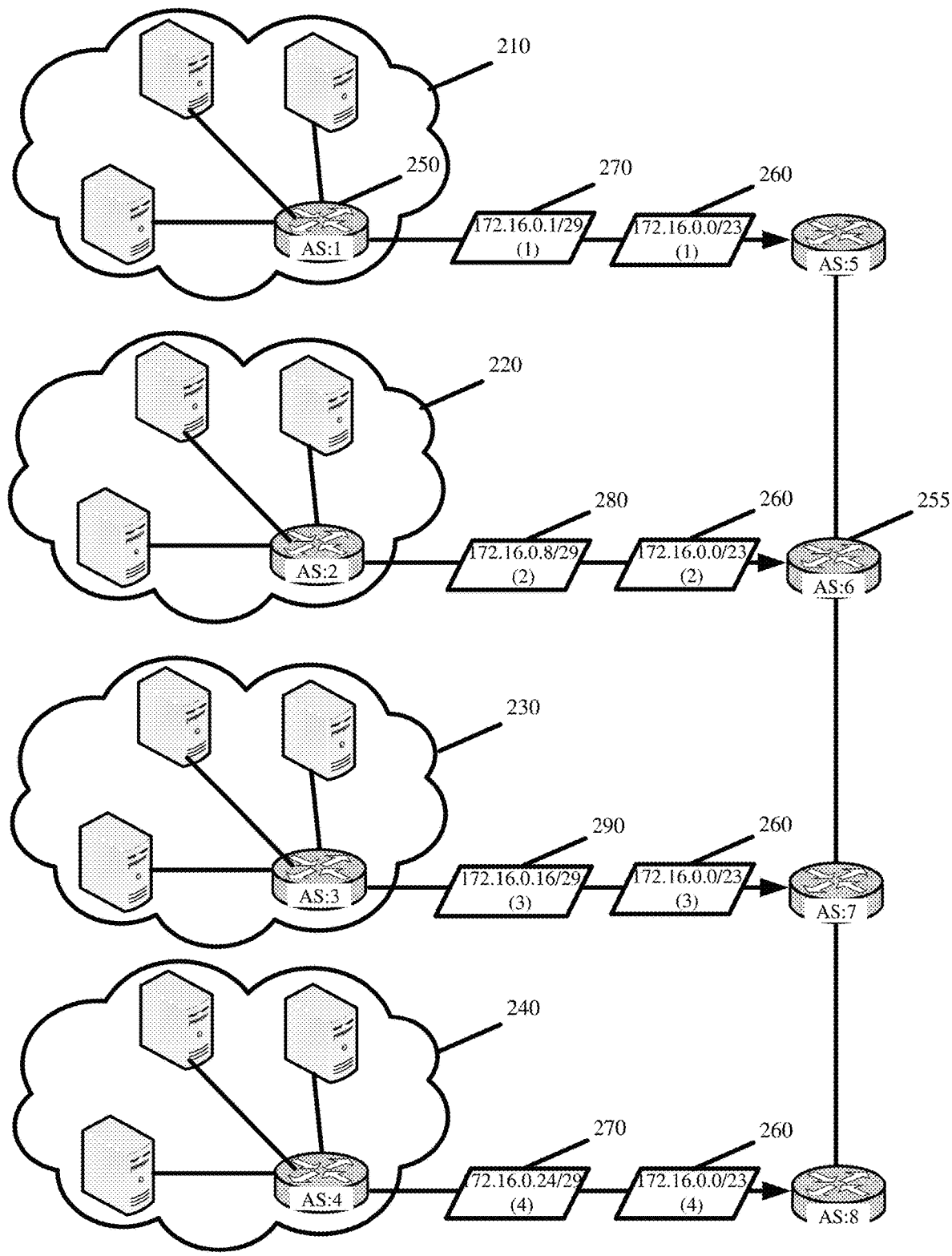
FIG. 2 conceptually illustrates advertising cover routes and specific routes in accordance with the two-tier Anycast addressing hierarchy of some embodiments.

FIG. 2 conceptually illustrates advertising cover routes and specific routes in accordance with the two-tier Anycast addressing hierarchy of some embodiments. The figure illustrates an Anycast system with four different points-of-presence (PoPs) 210, 220, 230, and 240. One or more servers as well as at least one gateway router (e.g., 250) operate in each of the PoPs 210, 220, 230, and 240. Each PoP 210, 220, 230, and 240 provides access to a common set of content or services or responds to requests directed to a common set of domains.

The PoPs 210, 220, 230, and 240 advertise the same cover route 260 with the same Anycast address (i.e., a first Anycast address) and first address prefix to neighboring or connected network routers. In some embodiments, the gateway router of the PoP advertises the cover route. The advertisement is typically a Border Gateway Protocol (BGP) route advertisement (i.e., BGP update message), although route and addressing advertisements for different network protocols can also be sent when the network routers route according to those different network protocols.

FIG. 2 also shows the PoPs 210, 220, 230, and 240 advertising different specific routes (i.e., a set of second Anycast addresses) that include different Anycast addressing falling within the cover route Anycast address. In this figure, the cover route Anycast address advertised from all PoPs 210, 220, 230, and 240 is 172.16.0.0/23, the specific route 270 advertised from the first PoP 210 is 172.16.0.1/29, the specific route 280 advertised from the second PoP 220 is 172.16.0.8/29, the specific route 290 advertised from the third PoP 230 is 172.16.0.16/29, and the specific route 295 advertised from the fourth PoP 240 is 172.16.0.24/29.

Figure 3:
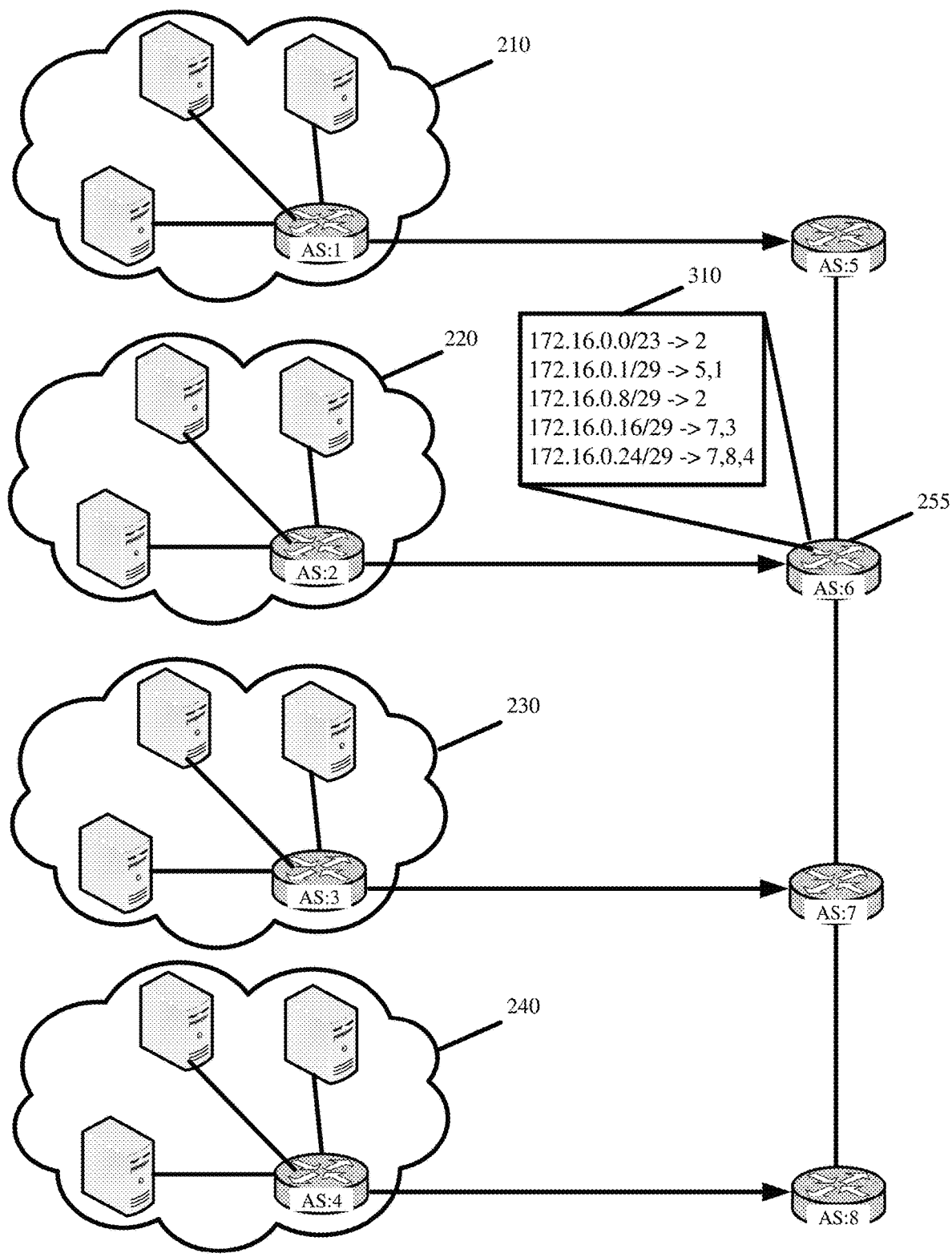
FIG. 3 illustrates the routing or forwarding table for a network router from FIG. 2.

The two-tier Anycast addressing hierarchy that is established as a result of the different cover route and specific route advertisements creates multiple entries in the forwarding or routing tables of the network routers that are unaffiliated with the Anycast system. FIG. 3 illustrates the routing or forwarding table 310 for network router 255 from FIG. 2. The routing or forwarding table 310 is populated based on the various cover route and specific route advertisements of FIG. 2.

The network router 255 uses Longest Prefix Matching (LPM) to select one of the multiple entries based on the addressing of received packets. If the incoming packet specifies an IP address 172.16.0.15, the packet does not match the addressing of any of the specific routes, but is a match for the cover route. Accordingly, the router 255 forwards the packet according to the path specified for the cover route. If the incoming packet specifies an IP address 172.16.0.16, this IP address matches both the cover route and the specific route advertised from the third PoP 230 of FIG. 2. Nevertheless, the forwarding or routing decision is controlled by the match with the longest prefix. In this case, the router 255 forwards the packet according to the path specified for the specific route advertised from the third PoP 230 rather than deferring to Anycast based routing to the nearest PoP advertising the cover route.

The two-tier Anycast addressing hierarchy establishes the Anycast system of some embodiments that supports deterministic traffic management. In other words, deterministic traffic management in an Anycast system is enabled by the two-tier Anycast addressing hierarchy of some embodiments. Such an Anycast system can leverage the deterministic traffic shifting in order to respond to a network attack on a particular location of the Anycast system, too much load at the particular location, a failure or outage at the particular location, or the need to perform maintenance at the particular location as some examples.

Some embodiments implement at least two different methodologies for deterministically shifting a specific amount of traffic from one Anycast system location to one or more other specifically selected Anycast system locations based on the two-tier Anycast addressing hierarchy established for the Anycast system of some embodiments. A first such methodology of some embodiments involves advertising in advance of any traffic shifting the two-tier Anycast addressing hierarchy. When traffic shifting is desired, Domain Name System (DNS) operation is dynamically modified to alter the resolution of some specific set of DNS queries that produce the deterministic amount of traffic to shift from the first-tier cover route address to the second-tier specific route address of a desired system location to receive the deterministic amount of traffic. In some such embodiments, the DNS operation is modified at the one or more DNS servers that are closest to the Anycast system location from which traffic is to be shifted away. In some embodiments, the DNS operation is modified at the one or more DNS servers that are authoritative over the domains that are selected to be shifted away from the Anycast system location.

Figure 4:
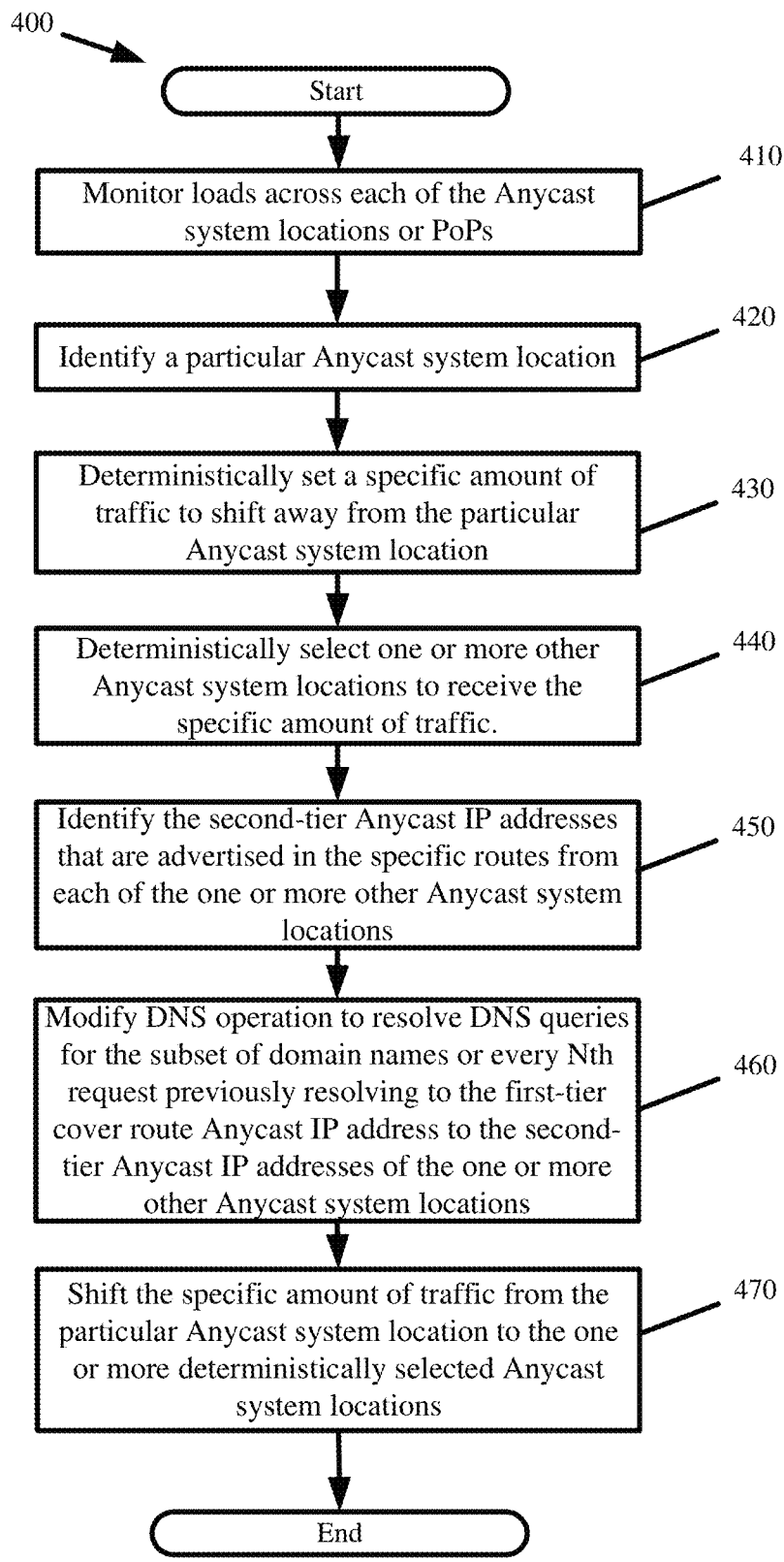
FIG. 4 presents a process for deterministically shifting traffic by dynamically modifying the DNS operation for an Anycast system with a two-tier Anycast addressing hierarchy in accordance with some embodiments.

FIG. 4 presents a process 400 for deterministically shifting traffic by dynamically modifying the DNS operation for an Anycast system with a two-tier Anycast addressing hierarchy in accordance with some embodiments. The process 400 commences by monitoring (at 410) loads across each of the Anycast system locations or PoPs.

The process identifies (at 420) a particular Anycast system location and deterministically sets (at 430) a specific amount of traffic to shift away from the particular Anycast system location as a result of the monitoring. In some embodiments, the monitoring automatically detects that the particular Anycast system location is experiencing load at or near capacity, a network attack, or is about to undergo routine or scheduled maintenance. In some embodiments, the specific amount of traffic to shift away from the particular Anycast system location can be defined as requests for a subset of domain names or as every Nth request that resolves and routes to the particular Anycast system location, wherein the requests for the subset of domain names or every Nth request at the particular Anycast system location approximately produce the specific amount of traffic or load at the particular Anycast system location.

The process deterministically selects (at 440) based on the monitoring, one or more other Anycast system locations to receive the specific amount of traffic. The one or more other Anycast system locations are selected based on the amount of excess capacity they have to absorb some or all of the traffic that is to be shifted. The selection also factors in performance, wherein the performance criterion is based on distance of the selected locations from the particular Anycast location.

The process identifies (at 450) the second-tier Anycast IP addresses that are advertised in the specific routes from each of the one or more other Anycast system locations selected at step 440. Here again, the second-tier Anycast IP addresses fall within the first-tier IP address subnet of the Anycast cover route advertised from all Anycast system locations. Stated differently, the second-tier Anycast IP addresses are a set of second Anycast addresses with an address prefix that is larger than the address prefix for the first Anycast address of the advertised Anycast cover route.

The process dynamically modifies (at 460) DNS operation so that DNS queries for the subset of domain names or every Nth request previously resolving to the particular Anycast system location based on the first-tier cover route Anycast IP address are instead resolved to the one or more other Anycast system locations based on the second-tier Anycast IP addresses in the specific routes advertised from the one or more other Anycast system locations. In some embodiments, the zone files or records of one or more DNS servers that are proximate to the particular Anycast system location are modified. More specifically, these are the DNS servers that receive DNS queries from clients that are also geographically proximate to the particular Anycast system location such that resolution of those DNS queries to the first-tier cover route Anycast IP address would result in subsequently issued requests from those clients with a destination address of the first-tier cover route Anycast IP address routing to the particular Anycast system location. In some embodiments, the dynamic modification includes adding a rule to the DNS servers where every Nth request is resolved to a specific route Anycast IP address rather than the cover route Anycast IP address. The modified DNS servers can be authoritative DNS servers operated by different content or service providers. The modified DNS servers can also be DNS servers under control of the Anycast system.

The process shifts (at 470) the specific amount of traffic from the particular Anycast system location to the one or more deterministically selected Anycast system locations as a result of the modified DNS operation. In accordance with some embodiments, FIGS. 5A, 5B, and 5C conceptually illustrate the deterministic traffic management resulting from process 400.

Figure 5A:
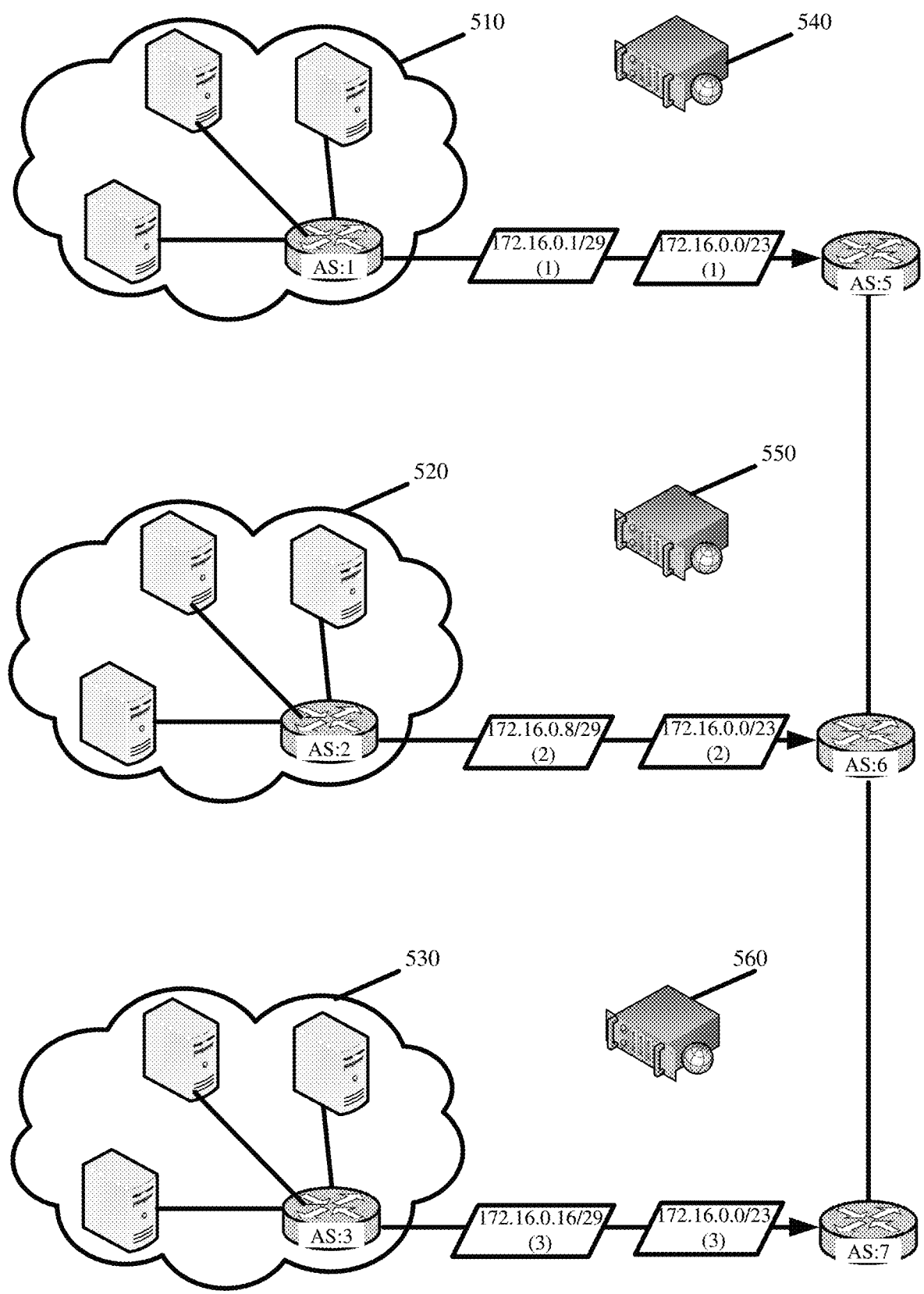
FIGS. 5A, 5B, and 5C conceptually illustrate the deterministic traffic management resulting from the process of FIG. 4.

FIG. 5A illustrates an Anycast system with three PoPs 510, 520, and 530 and three DNS servers 540, 550, and 560 that are geographically proximate to each of the PoPs 510, 520, and 530. Each PoP 510, 520, and 530 advertises a cover route with the same first-tier Anycast address and first address prefix, and a different specific route with a different second-tier Anycast address and second address prefix.

Figure 5B:
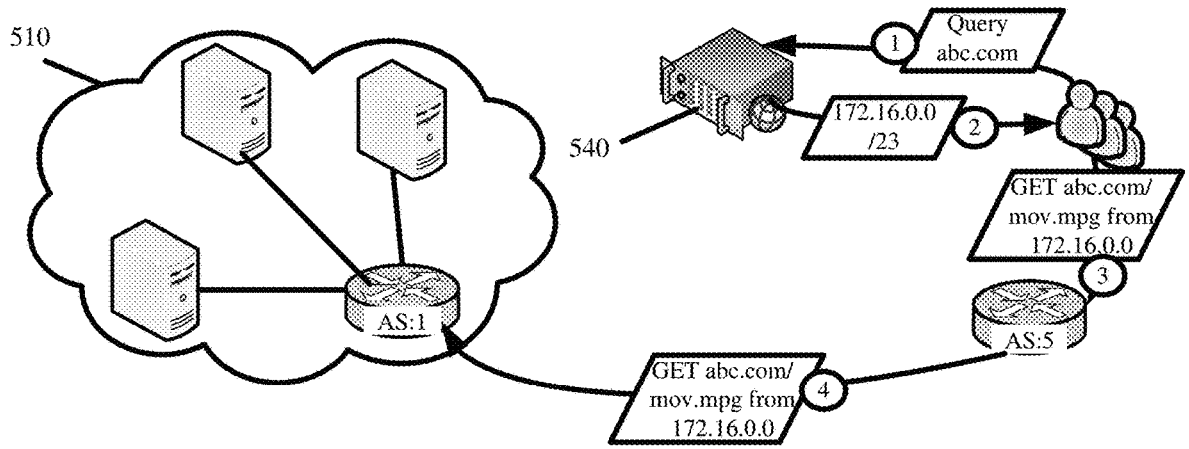
Figure 5B:
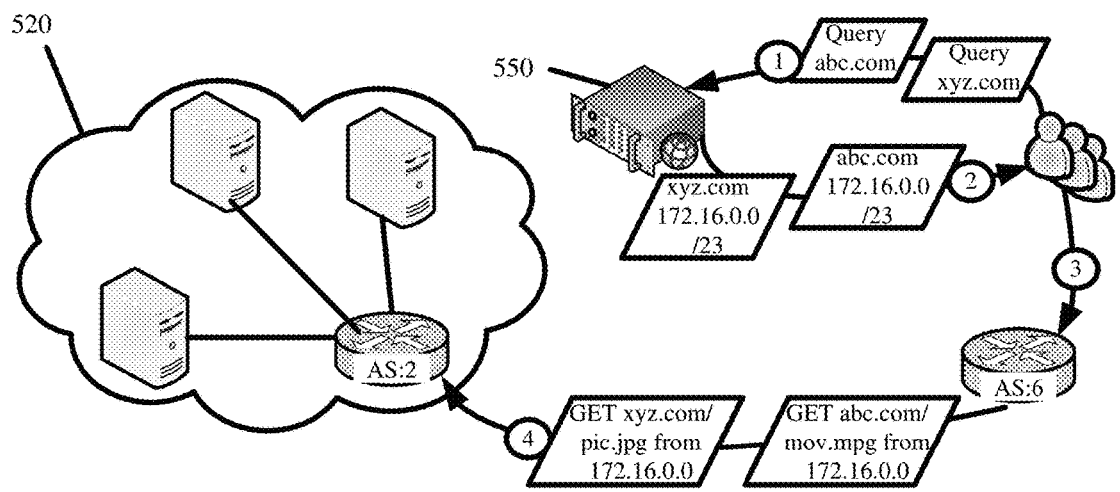
Figure 5B:
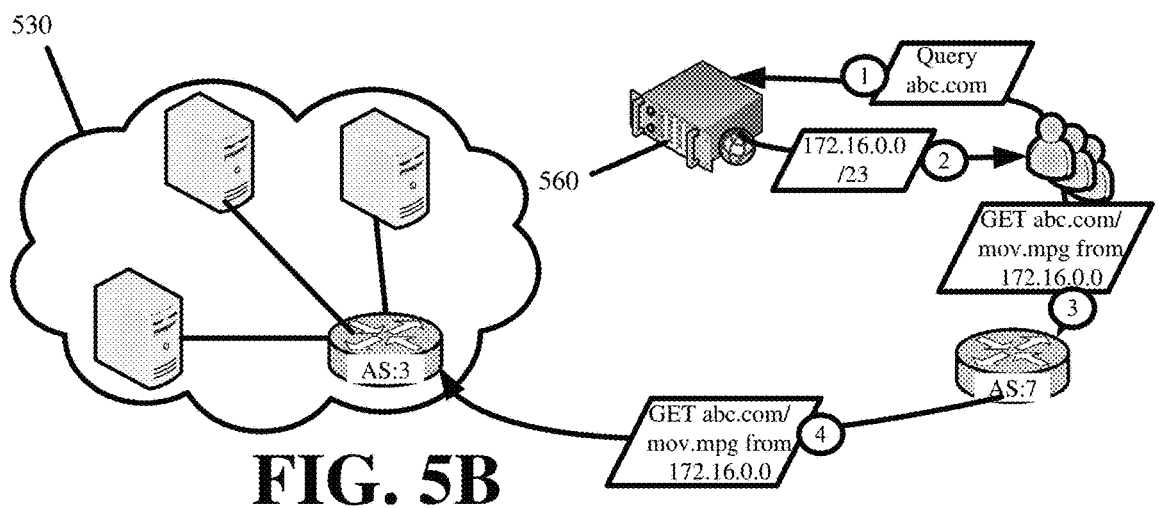

FIG. 5B illustrates a traditional Anycast operational mode of the Anycast system from FIG. 5A in which no deterministic traffic shifts are desired. In the traditional Anycast mode of operation, different sets of clients in different geographic regions send DNS queries to one of the DNS servers 540-560. The DNS servers 540-560 resolve the queries to the first-tier cover route Anycast address or a more specific Anycast address under the first-tier cover route Anycast address that is different than each of the second-tier Anycast addresses from the advertised specific routes. The clients then issue requests directed to the first-tier cover route Anycast address or Anycast address that is not an advertised specific route, and network routers route or forward those requests to the closest PoP.

Figure 5C:
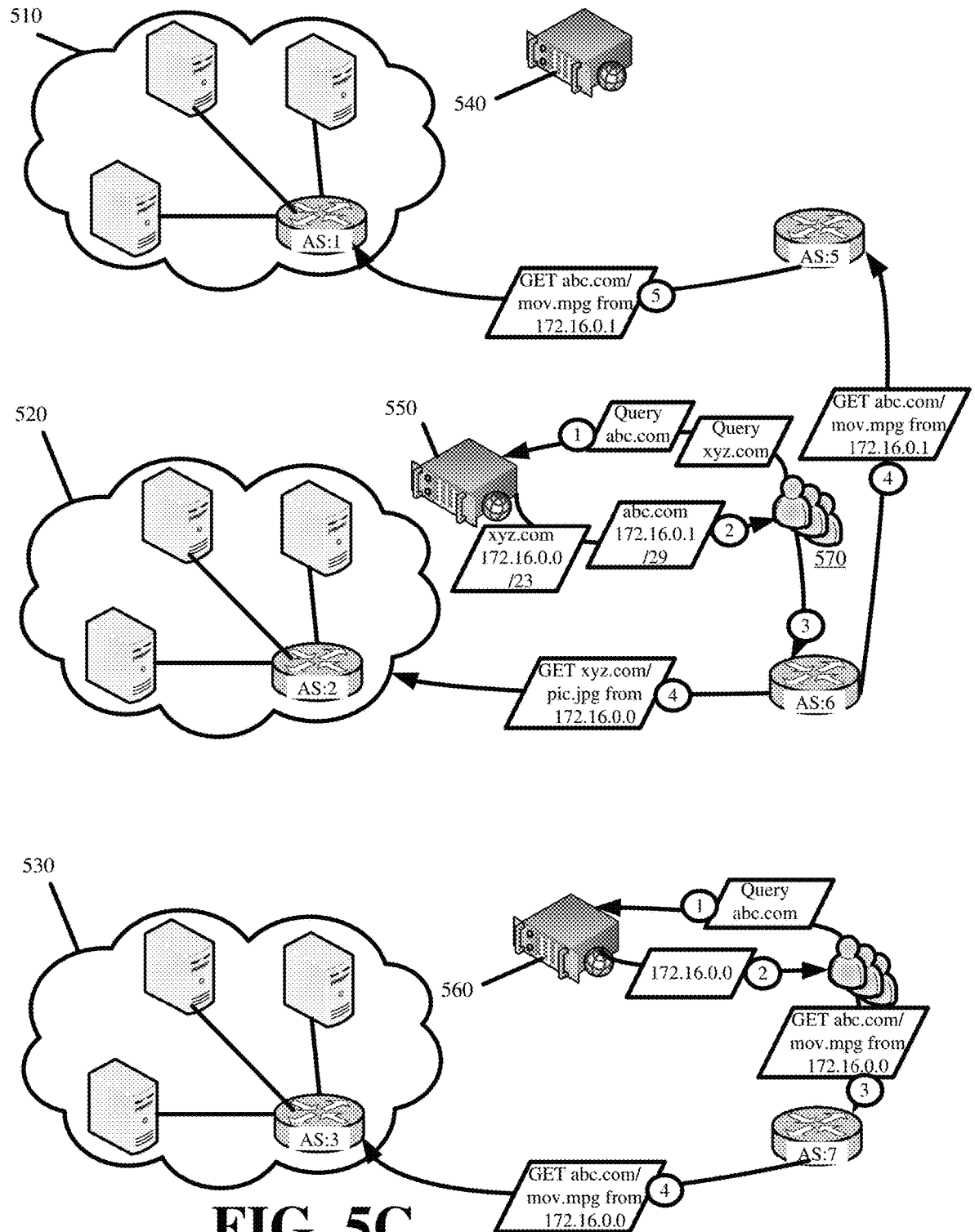

FIG. 5C illustrates a modified Anycast operational mode of the Anycast system from FIG. 5A in which a deterministic traffic shift has been defined in accordance with some embodiments. The modified Anycast operational mode temporarily overrides the traditional Anycast operational mode of FIG. 5B. In the modified Anycast mode of operation, DNS operation for DNS server 550 is modified in order to shift a deterministically specified amount of traffic from the second PoP 520 to the deterministically selected first PoP 510. The DNS server 550 is modified so that DNS queries for a subset of domain names or a subset of queries (e.g., every Nth query) from the set of clients 570 is resolved to a second-tier Anycast address for a specific route advertised from the first PoP 510 instead of the first-tier cover route Anycast address. Consequently, the network routers receive requests that are directed to the second-tier Anycast address advertised from the first PoP 510 from a subset of the set of clients that Anycast would ordinarily route to the second PoP 520. Based on LPM, the network routers now route or forward those requests to the first PoP 510, whereas requests from the same set of clients directed to the first-tier cover route Anycast address are still routed to the second PoP 520. In this manner, the specified amount of traffic is deterministically diverted from the second PoP 520 to the second PoP 510.

This methodology is also effective in thwarting attacks against an Anycast system. The Anycast system may be responsible for distributing content for several different content providers from its various locations or PoPs. DNS queries with domain names or Uniform Resource Locators (URLs) of any of the different content providers will be resolved to the first-tier Anycast address of the cover route under ordinary Anycast operation. Should an attack be directed to a particular content provider, the Anycast system, by way of the deterministic traffic management of some embodiments, can block the attack traffic from its PoPs. In particular, the DNS servers can temporarily resolve DNS queries directed to domain names or URLs of the particular content provider to a second-tier Anycast address of a specific route that is advertised from a location of the Anycast system that simply blackholes or redirects the attack traffic. DNS queries directed to domain names or URLs of other content providers can continue to be resolved to the first-tier cover route Anycast address such that subsequently issued requests to the first-tier cover route Anycast address are routed to the closest operational location of the Anycast system.

As noted above, some embodiments provide a second deterministic traffic management methodology based on an Anycast system with a two-tier Anycast addressing hierarchy. The second methodology involves dynamically advertising the specific routes with the second tier of Anycast addresses in order to effectuate a deterministic traffic shift in the Anycast system. Unlike the first methodology described with reference to FIG. 4, this second methodology does not involve modifying DNS operation to produce the traffic shift. In this second methodology, the DNS servers are preconfigured with multiple records for resolving DNS queries to the different second-tier Anycast IP addressing. Accordingly, the DNS servers resolve DNS queries to the second-tier Anycast IP address of at least one secondary Anycast system location, wherein the secondary Anycast system location is a different location than the Anycast system location closest to the DNS server. Requests issued to these second-tier Anycast IP addresses will still be routed to the nearest Anycast system location because of the advertised first-tier Anycast address of the cover route and because the second-tier Anycast IP addresses are only advertised when a deterministic traffic shift is desired. Thus, even though the DNS servers resolve DNS queries to the second-tier Anycast IP addresses, the network routers under ordinary Anycast operation do not have knowledge of the second-tier Anycast IP addresses. Accordingly, the network routers will route according to the first-tier Anycast IP address of the cover route until a deterministic traffic shifting implicating one of the second-tier Anycast IP addresses is desired and that second-tier Anycast IP address is dynamically advertised from the Anycast system location that is to receive the shifted traffic.

Figure 6:
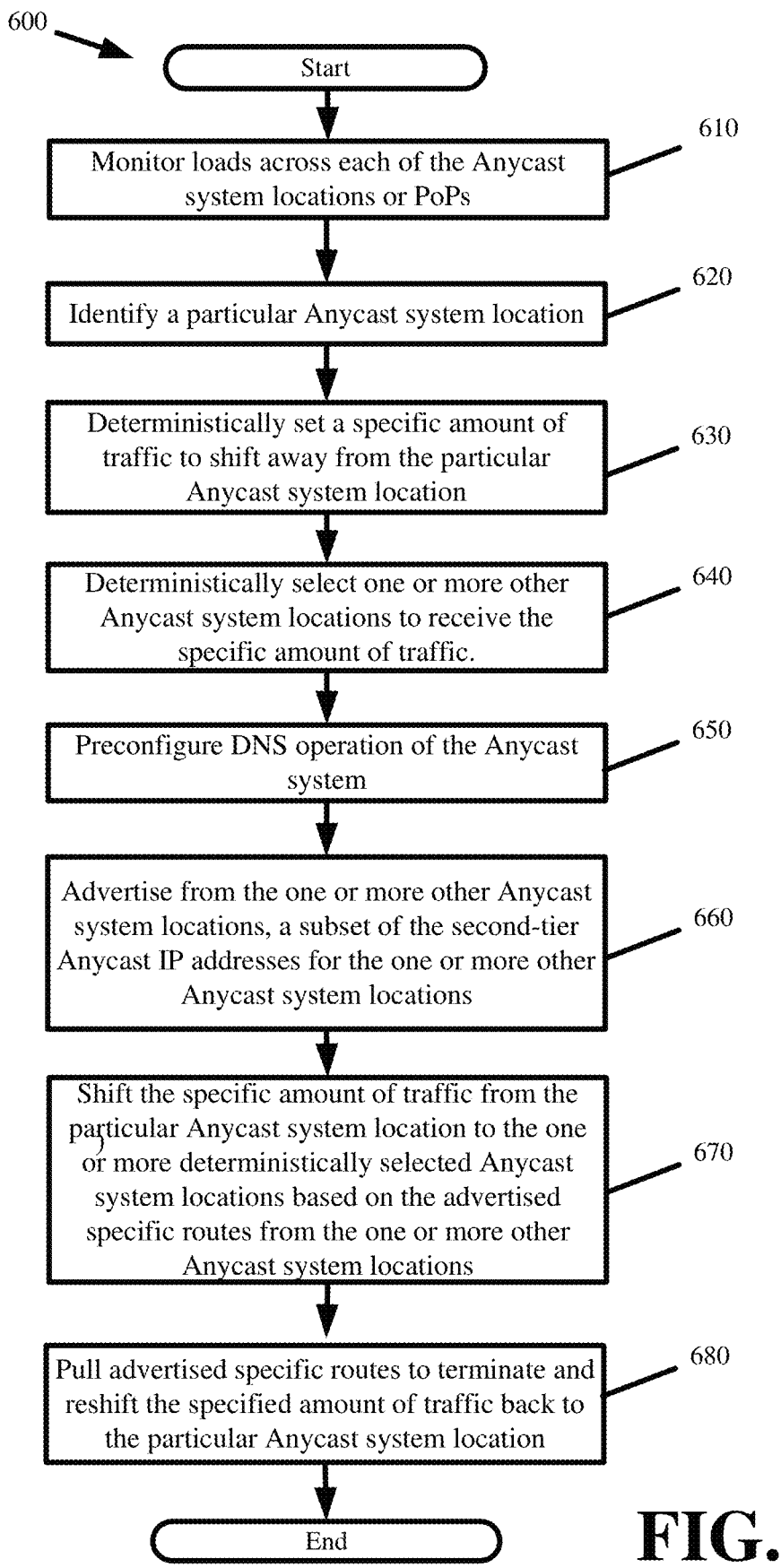
FIG. 6 presents a process for deterministically shifting traffic through dynamic advertising of the second-tier Anycast addressing from one or more of the Anycast system locations in accordance with some embodiments.

FIG. 6 presents a process 600 for deterministically shifting traffic through dynamic advertising of the second-tier Anycast addressing from one or more of the Anycast system locations in accordance with some embodiments. As with process 400 above, process 600 monitors (at 610) loads across each of the Anycast system locations or PoPs and based on the monitoring, identifies (at 620) a particular Anycast system location, deterministically sets (at 630) a specific amount of traffic to shift away from the particular Anycast system location, and deterministically selects (at 640) one or more other Anycast system locations to receive the specific amount of traffic.

The process preconfigures (at 650) DNS operation of the Anycast system. The preconfigured DNS operation resolves different subsets of domain names equating to different percentages or amounts of traffic at the different PoP to different second-tier Anycast addresses that have yet to be advertised.

The process dynamically advertises (at 660) from the one or more other Anycast system locations, a subset of the second-tier Anycast IP addresses for the one or more other Anycast system locations. The advertised subset of the second-tier Anycast IP addresses pertain to the domain names that produce the specific amount of traffic at the particular Anycast system location. These advertisements provide the network routers with more specific route information. Consequently, requests directed to the subset of second-tier Anycast IP addresses that were previously routed according to normal Anycast operation based on the cover route Anycast IP address will now be deterministically routed to the one or more other Anycast system locations. More specifically, the deterministic traffic shift is based on new entries being created in the routing or forwarding tables of the network routers as a result of the dynamically advertised second-tier Anycast IP addresses and the second-tier Anycast IP addresses taking precedence over the first-tier Anycast IP address due to LPM operation of the network routers.

The process shifts (at 670) the specific amount of traffic from the particular Anycast system location to the one or more deterministically selected Anycast system locations as a result of the dynamic advertising of the specific routes from the one or more other Anycast system locations. The process terminates (at 680) and re-shifts the specified amount of traffic back to the particular Anycast system location when the traffic shift is no longer desired by pulling the advertised specific routes.

Figure 7A:
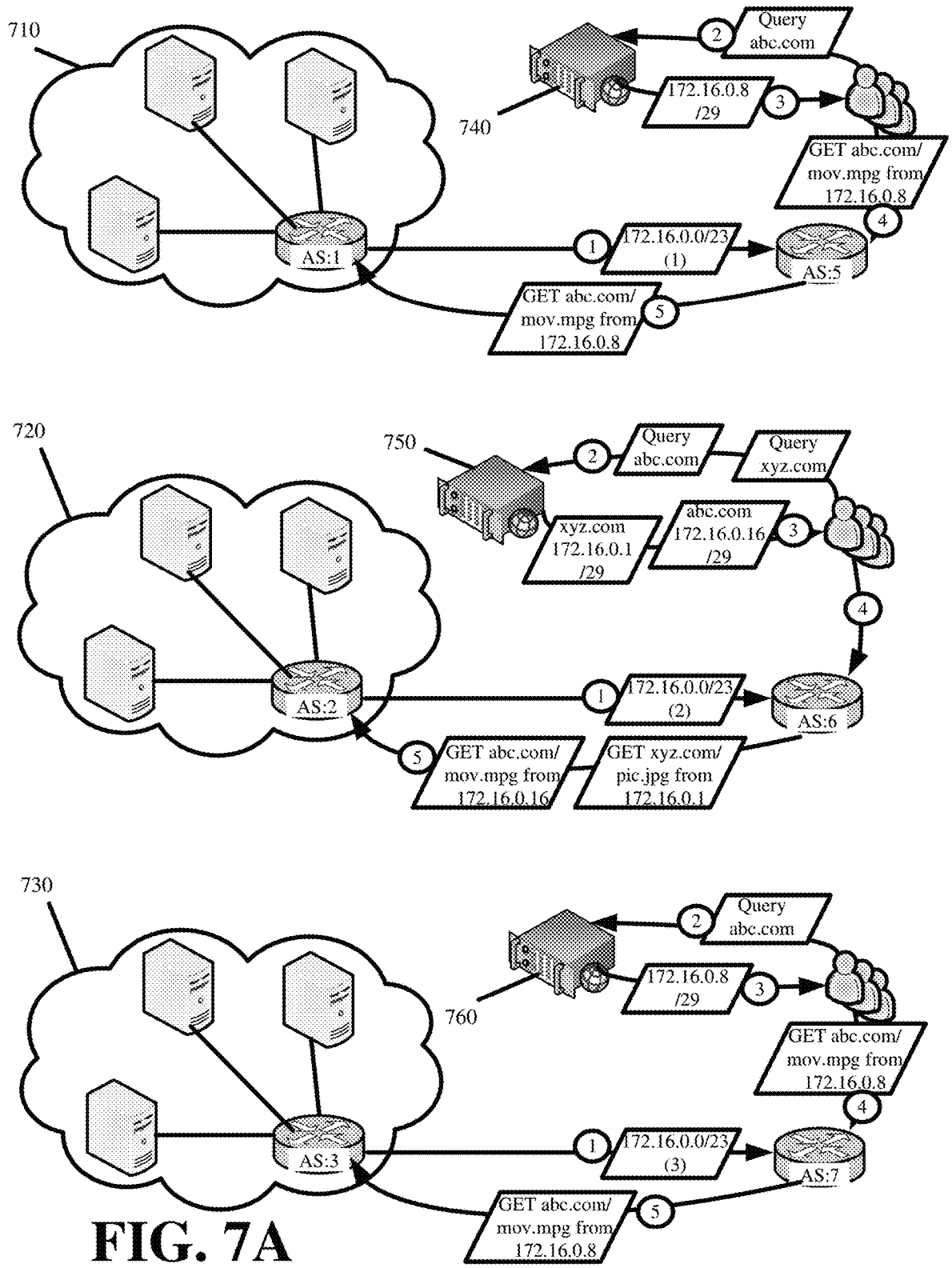
FIGS. 7A and 7B conceptually illustrate the deterministic traffic management resulting from the process of FIG. 6.
Figure 7B:
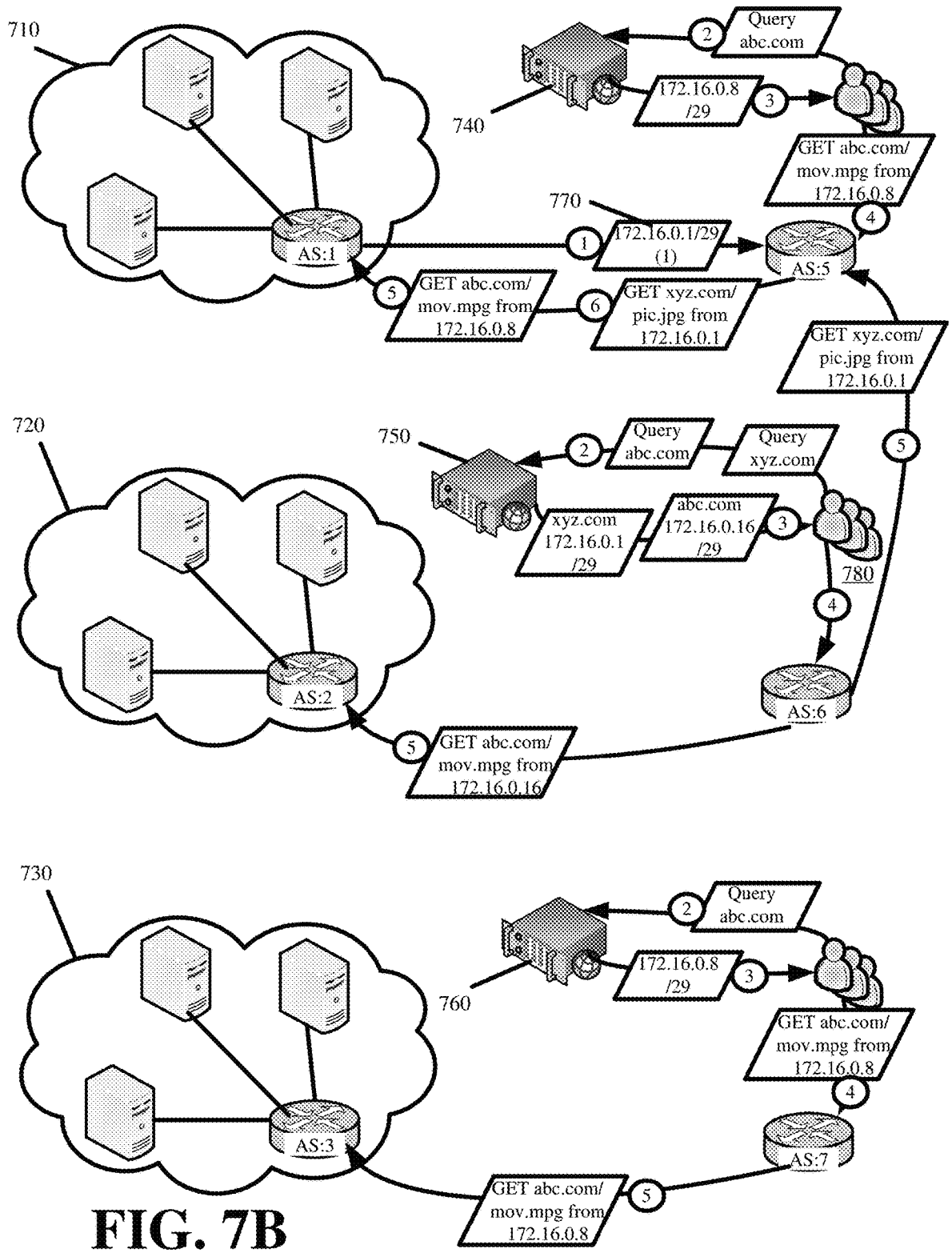

In accordance with some embodiments, FIGS. 7A and 7B conceptually illustrate the deterministic traffic management resulting from process 600. FIG. 7A illustrates an Anycast system with three PoPs 710, 720, and 730, and three DNS servers 740, 750, and 760 that are geographically proximate to one of the PoPs 710, 720, and 730. When no deterministic traffic shifting is desired, each PoP 710, 720, and 730 advertises only the cover route to the network routers. Meanwhile, the DNS servers 740, 750, and 760 are preconfigured to resolve DNS queries to second-tier Anycast addressing associated with the different PoPs 710, 720, and 730 even though the second-tier Anycast addressing has yet to be advertised. In particular, DNS server 750 resolves queries for a first domain to the second-tier Anycast address associated with the first PoP 710 and resolves queries for a second domain to the second-tier Anycast address associated with the second PoP 720. However, since the second-tier Anycast addressing has yet to be advertised, requests to those second-tier Anycast addresses that are received by the router closest to the second PoP 720 will be routed to the second PoP 720 based on the cover route advertisements identifying the cover route path to the second PoP 720 as the shortest path.

FIG. 7B then illustrates deterministically shifting traffic by introducing advertisements for the second-tier Anycast addressing to which the DNS queries are resolved. In particular, FIG. 7B illustrates shifting half of the traffic from the second PoP 720 to the first PoP 710. To do so, the first PoP 710 advertises (at 770) the specific route with a particular second-tier Anycast address that happens to be the same address that the DNS server 750 resolves queries for one of the two domains. The network routers now have a specific path to the first PoP 710 for the particular second-tier Anycast address. Accordingly, requests from the set of clients 780 to the particular second-tier Anycast address that were previously routed to the second PoP 720 under normal Anycast operation are now routed to the first PoP 710.

The two-tier Anycast addressing hierarchy can also be leveraged for automatic failover. In some such embodiments, each PoP of the Anycast system advertises both the first-tier cover route Anycast address as well as a different second-tier specific route Anycast address that is within the first-tier cover route Anycast address subnet or address prefix. The DNS servers resolve DNS queries to the second-tier Anycast address of a closest PoP.

Once a particular PoP fails, it stops advertising its second-tier Anycast address to the network routers. A time-to-live parameter will eventually cause the network routers to remove the second-tier Anycast address of the particular PoP from their routing or forwarding tables if a new advertisement with that address is not received for some configurable amount of time. Consequently, any requests that are directed to second-tier Anycast address of the particular PoP can still be routed based on the first-tier cover route Anycast address that is advertised by other PoPs.

Server, computer, and computing machine are meant in their broadest sense, and can include any electronic device with a processor including cellular telephones, smartphones, portable digital assistants, tablet devices, laptops, notebooks, and desktop computers. Examples of computer-readable media include, but are not limited to, CD-ROMs, flash drives, RAM chips, hard drives, EPROMs, etc.

Figure 8:
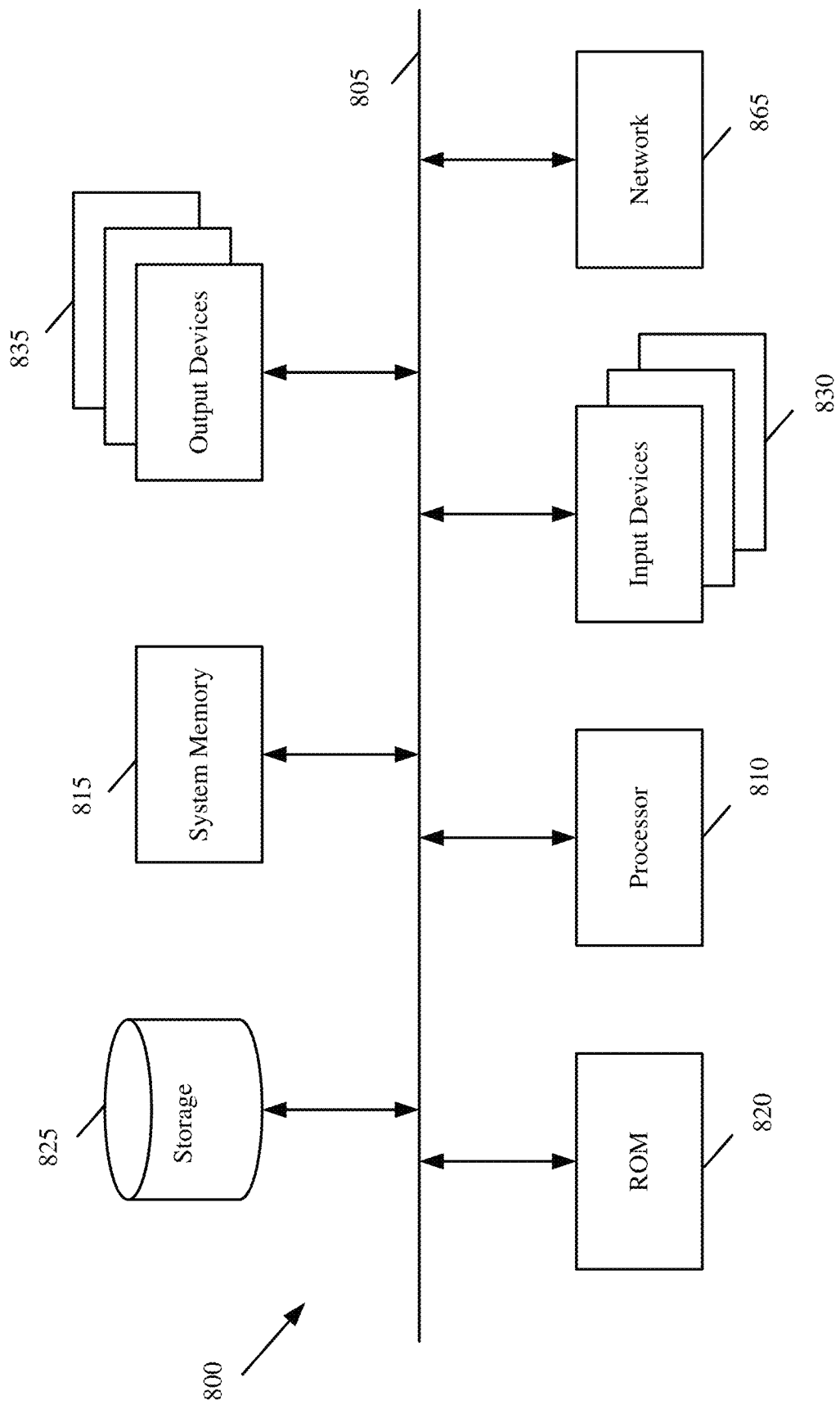
FIG. 8 illustrates a computer system or server with which some embodiments are implemented.

FIG. 8 illustrates a computer system or server with which some embodiments are implemented. Such a computer system includes various types of computer-readable mediums and interfaces for various other types of computer-readable mediums that implement the various methods and machines described above (e.g., load balancing appliance, back-end server, etc.). Computer system 800 includes a bus 805, a processor 810, a system memory 815, a read-only memory 820, a permanent storage device 825, input devices 830, and output devices 835.

The bus 805 collectively represents all system, peripheral, and chipset buses that communicatively connect the numerous internal devices of the computer system 800. For instance, the bus 805 communicatively connects the processor 810 with the read-only memory 820, the system memory 815, and the permanent storage device 825. From these various memory units, the processor 810 retrieves instructions to execute and data to process in order to execute the processes of the invention. The processor 810 is a processing device such as a central processing unit, integrated circuit, graphical processing unit, etc.

The read-only-memory (ROM) 820 stores static data and instructions that are needed by the processor 810 and other modules of the computer system. The permanent storage device 825, on the other hand, is a read-and-write memory device. This device is a non-volatile memory unit that stores instructions and data even when the computer system 800 is off. Some embodiments of the invention use a mass-storage device (such as a magnetic or optical disk and its corresponding disk drive) as the permanent storage device 825.

Other embodiments use a removable storage device (such as a flash drive) as the permanent storage device. Like the permanent storage device 825, the system memory 815 is a read-and-write memory device. However, unlike storage device 825, the system memory is a volatile read-and-write memory, such as random access memory (RAM). The system memory stores some of the instructions and data that the processor needs at runtime. In some embodiments, the processes are stored in the system memory 815, the permanent storage device 825, and/or the read-only memory 820.

The bus 805 also connects to the input and output devices 830 and 835. The input devices enable the user to communicate information and select commands to the computer system. The input devices 830 include alphanumeric keypads (including physical keyboards and touchscreen keyboards), pointing devices. The input devices 830 also include audio input devices (e.g., microphones, MIDI musical instruments, etc.). The output devices 835 display images generated by the computer system. The output devices include printers and display devices, such as cathode ray tubes (CRT) or liquid crystal displays (LCD).

Finally, as shown in FIG. 8, bus 805 also couples computer 800 to a network 865 through a network adapter (not shown). In this manner, the computer can be a part of a network of computers (such as a local area network ("LAN"), a wide area network ("WAN"), or an Intranet, or a network of networks, such as the Internet).

As mentioned above, the computer system 800 may include one or more of a variety of different computer-readable media. Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, ZIP® disks, read-only and recordable blu-ray discs, any other optical or magnetic media, and floppy disks.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

We claim:

1. A method comprising:
configuring a first Domain Name System (DNS) record to resolve a plurality of domains to a cover route address that k defined to a first network prefix;
resolving a first plurality of requests, that are directed to the plurality of domains, to the cover route address using the first DNS record;
determining a particular amount of load to shift away from a first network location, wherein the load at the first network location results in part from the first plurality of requests being resolved to the cover route address; and
configuring, in addition to the first DNS record, a second DNS record that resolves a subset of the plurality of domains to a specific address of a second network location, wherein the specific address comprises a second network prefix that is larger than the first network prefix, and wherein the specific address further comprises a first part that matches the cover route address up to the first network prefix, and a second part that is defined after the first network prefix;
resolving a first subset of a second plurality of requests to the cover route address based on the first subset of requests comprising domains that are in the plurality of domains and that are not in the subset of domains; and
resolving a second subset of the second plurality of requests to the specific address based on the second subset of requests comprising domains in the subset of domains, and the second DNS record taking precedence over the first DNS record for the subset of domains covered by both the second DNS record and the first DNS record based on the second network prefix of the specific address being larger than the first network prefix of the cover route address.

2. The method of claim 1 further comprising:
advertising the cover route address from each of the first network location and the second network location before resolving the first plurality of requests.

3. The method of claim 2 further comprising:
advertising the specific address from the second network location after resolving the first plurality of requests and before resolving the first subset and the second subset of the second plurality of requests.

4. The method of claim 3,
wherein advertising the cover route address comprises advertising Border Gateway Protocol (BGP) update messages with the cover route address from each of the first network location and the second network location prior to resolving the first plurality of requests; and
wherein advertising the specific address comprises advertising a Border Gateway Protocol (BGP) update message with the specific address from the second network location after resolving the first plurality of requests and before resolving the first subset and the second subset of the second plurality of requests.

5. The method of claim 1 further comprising:
monitoring load imposed on the first network location by each domain of the plurality of domains specified in the first plurality of requests; and
determining that the subset of domains generate a subset of the load at the first network location that is equal to or greater than the particular amount of load.

6. The method of claim 1, wherein configuring the second DNS record comprises:
identifying a DNS server that is geographically closer to the first network location than the second network location; and
adding the second DNS record to a DNS table of the DNS server.

7. The method of claim 1, wherein the first network location is uniquely associated with a specific first network location address, wherein the second network location is uniquely associated with the specific address, and wherein each of the specific first network location address and the specific address of the second network location is an address within a subnet of the cover route address.

8. The method of claim 1 further comprising:
monitoring load at the first network location and the second network location after said resolving of the first plurality of requests; and
selecting the second network location to receive the particular amount of load from the first network location in response to determining, from said monitoring, that the second network location has sufficient unused capacity to handle the particular amount of load.

9. The method of claim 1 further comprising:
selecting the second network location to receive the particular amount of load from the first network location based on excess capacity of the second network location and performance of the second network location to regions served by the first network location.

10. The method of claim 1 further comprising:
determining that a subset of a plurality of content generates a subset of the load at the first network location that is equal to or greater than the particular amount of load; and
selecting the subset of the second plurality of requests that are directed to the subset of content for resolution to the specific address.

11. The method of claim 1, wherein each of the first network location and the second network location serve a same set of content and services.

12. The method of claim 1, wherein the cover route address and the specific address are Internet Protocol version 4 addresses or Internet Protocol version 6 addresses.

13. The method of claim 1, wherein the first network prefix for the cover route address is between /12 and /31, and wherein the second network prefix is between /13 and /32 and larger than the first network prefix.

14. A system comprising:
a first network location providing access to a set of content or services;
a second network location providing access to the set of content or services;
one or more devices comprising:
one or more processors configured to:
configuring a first Domain Name System (DNS) record to resolve a plurality of domains to a cover route address that is defined to a first network prefix;
resolve a first plurality of requests, that are directed to the plurality of domains, to the cover route address based on the first DNS record;
determine a particular amount of load to shift away from the first network location, wherein the load at the first network location results in part from the first plurality of requests being resolved to the cover route address; and
configure, in addition to the first DNS record, a second DNS record that resolves a subset of the plurality of domains to a specific address of the second network location, wherein the specific address comprises a second network prefix that is larger than the first network prefix, and wherein the specific address further comprises a first part that matches the cover route address up to the first network prefix, and a second part that is defined after the first network prefix;
resolve a first subset of a second plurality of requests to the cover route address based on the first subset of requests comprising domains that are in the plurality of domains and that are not in the subset of domains; and
resolve a second subset of the second plurality of requests to the specific address based on the second subset of requests comprising domains in the subset of domains, and the second DNS record taking precedence over the first DNS record for the subset of domains covered by both the second DNS record and the first DNS record based on the second network prefix of the specific address being larger than the first network prefix of the cover route address.

15. The system of claim 14,
wherein the first network location comprises a gateway router that advertises the cover route address prior to the resolution of the first plurality of requests; and
wherein the second network location comprises a gateway router that advertises the cover route address prior to the resolution of the first plurality of requests.

16. The system of claim 15,
wherein the gateway router of the second network location further advertises the specific address after resolution of the first plurality of requests and before resolution of the first subset and the second subset of the second plurality of requests.

17. A non-transitory computer-readable medium, storing a set of processor-executable instructions, which, when executed by one or more processors, cause the one or more processors to:

configure a first Domain Name System (DNS) record to resolve a plurality of domains to a cover route address that is defined to a first network prefix;

resolve a first plurality of requests, that are directed to the plurality of domains, to the cover route address, using the first DNS record;

determine a particular amount of load to shift away from a first network location, wherein the load at the first network location results in part from the first plurality of requests being resolved to the cover route address; and configure, in addition to the first DNS record, a second DNS record that resolves a subset of the plurality of domains to a specific address of a second network location, wherein the specific address comprises a second network prefix that is larger than the first network prefix, and wherein the specific address further comprises a first part that matches the cover route address up to the first network prefix, and a second part that is defined after the first network prefix;

resolve a first subset of a second plurality of requests to the cover route address based on the first subset of requests comprising domains that are in the plurality of domains and that are not in the subset of domains; and resolve a second subset of the second plurality of requests to the specific address based on the second subset of requests comprising domains in the subset of domains, and the second DNS record taking precedence over the first DNS record for the subset of domains covered by both the second DNS record and the first DNS record based on the second network prefix of the specific address being larger than the first network prefix of the cover route address.

\* \* \* \* \*